United States Patent [11] 3,526,196

[72] Inventor Alexander P. De Seversky
 Northport, New York
[21] Appl. No. 777,844
[22] Filed Nov. 21, 1968
[45] Patented Sept. 1, 1970
[73] Assignee Seversky Electronatom Corporation
 New York, New York
 a corporation of New York

[54] AUXILIARY BURNER ASSEMBLY FOR INCINERATOR SYSTEMS
 12 Claims, 5 Drawing Figs.

[52] U.S. Cl. .................................................. 110/8,
 110/18
[51] Int. Cl. ..................................................... F23g 3/02
[50] Field of Search .......................................... 110/7, 8,
 8A, 18, 18A

[56] References Cited
UNITED STATES PATENTS
2,640,447 6/1953 Blum ........................... 110/18
3,150,619 9/1964 Brucken et al. ............... 110/8

Primary Examiner—Kenneth W. Sprague
Attorney—Michael Ebert

ABSTRACT: An auxiliary burner assembly for an incinerator system, in which garbage is fed into a furnace through hoppers providing access to a flue extending from the furnace upwardly through the building and terminating in a chimney. Papers and other light-weight, floatable waste matter tend to be carried up the flue by the chimney draft rather than to be burned in the furnace, thereby clogging the upper reaches of the flue. The auxiliary burner assembly is in the form of a grid including heating elements, which grid is disposed above the highest hopper in the flue and acts to entrap and burn the floatable waste matter to maintain flue clearance, means being provided to render the assembly heating elements operative at appropriate intervals.

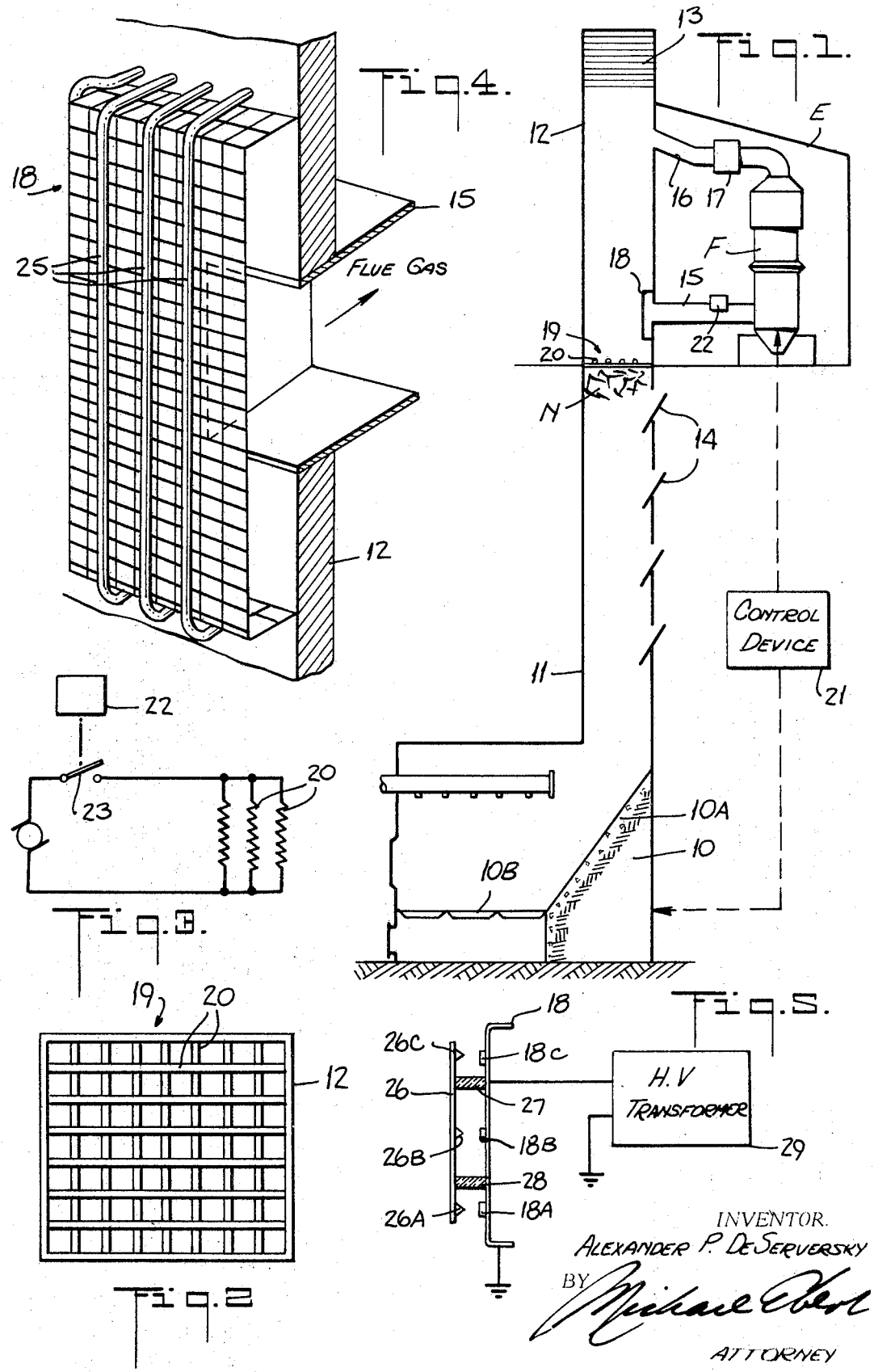

AUXILIARY BURNER ASSEMBLY FOR INCINERATOR SYSTEMS

This invention relates generally to incinerator systems, and more particularly to a burner assembly for an incinerator flue to maintain this passage free of papers and other unburned light-weight waste matter.

In modern apartment houses, it is no longer the common practice to dispose of garbage by having the tenants deliver their food leavings, trash, old newspapers and other waste matter to the basement, where they are collected in large receptacles to be later picked up by sanitation trucks and dumped. The use of incinerator systems to burn garbage has become widespread. Such systems not only do away with the need to collect garbage and make it more convenient for the tenants, but they also serve to reduce the load imposed on the municipal sanitation service, for it is far easier to remove and dispose of ashes than unburned garbage.

In an incinerator system, a furnace is installed in the basement of the building and is coupled through a vertical flue extending to a chimney on the roof. On each floor of the building, access to the flue is had through a swinging hopper. Garbage deposited in the hopper by the tenant falls down the flue into the furnace. At some time in the day, when a load of garbage has collected in the furnace, the hopper doors are locked and the garbage fired, combustion gases being conveyed through the flue and being exhausted into the atmosphere through the chimney.

The flue gases are laden with various combustion products and other impurities which give rise to atmospheric pollution, particularly in heavily populated metropolitan areas having a large number of working incinerators. Nevertheless, a recent attempt in a large municipality to shut down incinerators, drew strong objections from the sanitation department because of the unduly heavy burden then imposed on the department by the need to dispose of unburned garbage. For the purpose of reducing atmospheric pollution, it is known to use water scrubbers and electrostatic precipitators, and other forms of filters, in conjunction with the incinerator system to extract particulate matter and noxious gases from the flue gases before discharge into the atmosphere. By the use of such filters, it becomes possible to retain the advantages gained by the use of incinerators without the drawbacks incident thereto.

Thus in my U.S. Pat. No. 3,315,444, there is disclosed an integrated scrubber and electrostatic precipitator filter structure, which includes an intake duct projecting into the incinerator flue, the incoming flue gas being conveyed at high velocity through the filter structure which functions to extract impurities therefrom, the purified gas then being returned to the flue for discharge through the chimney. A screen is mounted over the intake duct to prevent the admission of exceptionally large unburned pieces which would otherwise tend to clog the filter structure.

Because of the updraft produced in the flue by chimney action, newspapers and other light-weight and floatable forms of waste, instead of falling by gravity into the incinerator furnace, rise upwardly in the flue and collect about the intake screen of the intake duct of the filter structure or within the mesh basket mounted on top of the flue chimney. This accumulation of waste matter tends to clog the filter structure as well as the flue system, and interferes with the proper operation thereof. It becomes necessary, therefore, on occasion to shut down the incinerator system and filter structure and to remove the unburned newspapers and other waste matter from about the clogged screens, thereby adding substantially to maintenance cost.

Accordingly, it is the primary object of this invention to provide an auxiliary burner assembly for an incinerator system, which assembly acts to trap and ignite newspapers and other light-weight waste matter floating to the upper reaches of the incinerator, to prevent clogging thereof.

Also an object of the invention is to provide an auxiliary burner assembly of the above-described type, which is rendered operative automatically only when the incinerator system is functioning and only when an accumulation of waste matter exists which creates a condition of clogging which requires such operation.

Yet another object of the invention is to provide an auxiliary burner assembly which is reliable and efficient in operation, which is inexpensive to manufacture, and which may readily be installed at low cost in existing incinerator systems.

Briefly stated, these objects are attained in an incinerator system in which a basement furnace is coupled by a flue extending upwardly through the building to a chimney above the roof thereof, hoppers providing access to the flue at each floor level in the building, whereby garbage may be fed into the furnace to be burned therein. Impurity-laden gas emitted by the furnace is drawn from the flue by an intake duct leading to a filter structure whose purified output is returned to the flue by an outlet duct, the intake duct projecting into the flue above the highest hopper in the building. An auxiliary burner assembly is interposed in the flue between the intake duct and the highest hopper, said assembly including a grid to trap newspapers and other floating waste matter, and heater or spark elements to ignite the trapped matter, means being provided to render the elements operative at appropriate intervals.

For a better understanding of the invention, as well as other objects and further features thereof, reference is made to the following detailed description to be read in conjunction with the accompanying drawing, wherein:

FIG. 1 schematically illustrates in elevation an incinerator system coordinated with a filter structure, in combination with an auxiliary burner assembly in accordance with the invention;

FIG. 2 is a plan view or the auxiliary burner assembly included in FIG. 1;

FIG. 3 is the electrical circuit of the burner assembly;

FIG. 4 is another embodiment of a burner assembly in accordance with the invention; and FIG. 5 shows an alternative technique for igniting the burner shown in FIG. 4.

Referring now to FIG. 1, there is shown an incinerator system of standard design, installed in a multi-story apartment building, hospital or other high-rise structure requiring garbage disposal facilities. The incinerator system includes a furnace 10 installed in the basement of the building, the furnace being supplied with waste matter to be burned by a charging and gas flue 11. Furnace 10 includes a hearth 10A, a grate 10B, and an underfire air register 10C.

Flue 11 extends upwardly through the building and terminates in a chimney 12 on the roof, the chimney being capped by a mesh basket 13, preferably of stainless steel. On each floor of the building, access to the flue is had through a swinging hopper 14, waste matter fed into the hopper falling down flue 11 into furnace 10, where it is collected and burned to produce an impurity-laden gas which is exhausted into the atmosphere through chimney 12.

Installed on top of the building in an enclosure E, is a filter structure F, which may be of the type disclosed in my above-identified patent, or of any available commercial type, such as a standard water scrubber. It is to be understood that the filter structure per se, forms no part of the present invention. The impurity-laden incinerator gas evolved in the furnace is drawn at high velocity into the filter system F by means of an intake duct 15 which communicates with flue 11. The impurity-laden gas drawn into the filter assembly F is purified therein, the impurity-free gas being returned to the flue through an outlet duct 16 close to the top of the chimney. Gates may be provided in the intake and outlet ducts to cut off the filter structure from the incinerator system. Since the gas yielded by filter structure F is no longer polluting, it may be discharged directly into the atmosphere, and there is no need for a high stack to disperse the pollutants.

The impurity-laden gas derived from the flue is conducted through filter structure F by means of a blower 17 interposed in outlet duct 16 and driven by a suitable motor. The velocity of gas flow produced by the blower is such that when the blower is driven, substantially all of the flue gas is by-passed into the filter structure.

A filter screen 18 is mounted within the flue at the entrance to intake duct 15 to prevent the admission of exceptionally large particles of debris therein. In practice, because of the updraft produced by the chimney action, newspapers and other light-weight waste matter, instead of falling into the furnace to be burned, is caused to float upwardly in the flue and to collect about the screen 18, and also within the chimney basket 13. As a consequence, when furnace 10 is fired and filter structure F put into operation, the flue passage and the intake to the filter assembly are clogged, and the system rendered inoperative. It becomes necessary, therefore, to clear the waste matter from the screens before the system can be placed in operation.

To avoid the danger of clogging and to minimize maintenance costs, there is provided an auxiliary burner assembly, generally designated by numeral 19, which is removably mounted in flue 11 at a position above the highest hopper 14 in the system, but below the entrance to duct intake 15.

The auxiliary burner 19, as shown separately in FIG. 2, is formed by a rack of calrods or other electrical heating elements, the calrods 20 being arranged in an intersecting pattern to define a relatively coarse grid which in no way interferes with gas flow in the flue, but which serves to intercept newspapers N and other light-weight matter which floats upwardly in the flue and is trapped below the auxiliary burner grid. Thus in the course of a day, as garbage is deposited in the hoppers, waste matter accumulates under the auxiliary burner.

The control device 21 for the gas-operated or other burners in the incinerator furnace, which may be of conventional design and which acts to fire the garbage deposited therein, also functions to render the filter structure F operative and to start blower 17. Because the flue passage is somewhat clogged by the presence of waste matter N, initially there is a sharp pressure drop in intake duct 15. This drop is sensed by a pressure-responsive device, such as a Sylphon bellows 22 which is adapted to activate an electrical switch 23, as shown in FIG. 3, the setting being such that this switch is closed only when a condition of clogging is sensed.

Switch 23, when closed, completes a circuit between an electrical power supply 24 and the electrical heating elements 20. When this happens, the entrapped paper in contact with the heating elements, is ignited, and as the paper burns, the flue passage becomes unclogged. As a consequence, the pressure drop within intake duct 15 is reduced, this being sensed by the pressure-responsive device 22, thereby causing switch 23 to open to deenergize the auxiliary burner. Thus the auxiliary burner is kept in operation only for a brief period sufficient to burn away the waste matter blocking the flue passage.

Instead of a removable rack of electrical heating elements separate from screen 18 on intake duct 15, these elements may be combined with the screen. Thus, as shown in FIG. 4, the intake screen 18 which is formed of a wire mesh, has mounted thereon an array of electrical heating rods 25 (i.e., calrods) which serve the purpose of burning off waste paper and other matter blocking the duct. One may use both an auxiliary burner in the form of a rack and an auxiliary burner combined with the intake mesh.

Instead of a pressure-sensitive device to sense the existence of clogging matter, a velocity-sensitive device, such as a Pitot tube, may be used in a similar fashion, to actuate a switch to turn on the auxiliary burner. Alternatively, the operation of the auxiliary burner may be tied in with the furnace operation, such that after the furnace temperature rises to a predetermined level, the auxiliary burner is turned on for a brief period sufficient to ignite whatever matter is trapped therein. Also, instead of electrical heater elements, the auxiliary burner may be constituted by gas-operated nozzles for the same purpose.

In practice, the auxiliary burners may be cyclically turned on by a time clock, which cycle is set to correspond with the refuse burn cycle, the time clock also actuating the filter device. Thus the operation of the auxiliary burners may be under the control of a clock, a pressure-differential system, or variations in gas velocity.

Referring now to FIG. 5, there is shown the intake screen 18 with a spark-gap structure rather than with burners to ignite waste matter collected across the screen. This structure is formed by a conductive electrode support 26 mounted on stand-off insulators 27 and 28 secured to the screen. Attached to electrode support 26 are a plurality of spark contacts 26A, 26B and 26C, and attached to one of the screen wires are complementary contacts 18A, 18B and 18C, a gap being created between each pair of associated contacts.

The output of a suitable high-voltage transformer supply 29 is connected at one end between electrode support 26 and screen 18, this being accomplished by a lead 30 extending through insulator 27, the other ends of the supply and the screen being both grounded. Thus when the voltage is applied, sparks are produced in the air gaps between the spark contacts to ignite the waste matter collected on the screen. The advantage of the spark arrangement, as compared to the use of electrical heater elements, is that it draws relatively little operating current. A similar spark-gap structure may be used on grid 19, in place of burners.

While there have been shown and described preferred embodiments of auxiliary burner assemblies in accordance with the invention, it will be appreciated that many changes and modifications may be made therein without, however, departing from the essential spirit of the invention as defined in the annexed claims.

I claim:

1. In a building having an incinerator system in which a furnace in the basement is coupled by a flue extending upwardly through the building to a chimney above the roof thereof, a series of hoppers providing access to the flue at each floor level of the building, whereby garbage may be dropped into the furnace to be burned therein, impurity-laden gas going up the flue to the chimney, the combination of:
   a. a filter structure having an intake duct communicating with the flue at a position above the highest hopper therein said structure drawing impurity-laden gas from the flue and returning impurity-free gas into the flue through an outlet duct for discharge into the atmosphere; and
   b. an auxiliary burner assembly for preventing newspapers and other light-weight waste matter which does not fall into the furnace but which floats upwardly in the flue from clogging said flue, said assembly including a grid disposed in said flue in advance of said intake duct to entrap said waste matter, means on said grid to ignite the entrapped matter, and means to render said ignition means operative at appropriate intervals.

2. In an arrangement as set forth in claim 1, further including a second grid disposed across said intake duct, means on said second grid to ignite the matter entrapped therein, and means to render said ignition means operative at appropriate intervals.

3. In an arrangement as set forth in claim 1, wherein said ignition means are in the form of electrical heater rods which are arranged in an intersecting pattern to define said grid.

4. In an arrangement as set forth in claim 1, wherein said ignition means are electrical heaters.

5. In an arrangement as set forth in claim 1, wherein said ignition means are gas-operated heaters.

6. In an arrangement as set forth in claim 1, wherein said ignition means are spark gaps operated by a high-voltage supply.

7. In an arrangement as set forth in claim 1, further including means to render said auxiliary burner automatically operative only when said filter structure is functioning and the passage to said intake duct is clogged by said waste matter.

8. In an arrangement as set forth in claim 7, wherein said automatic means is constituted by a pressure-responsive device coupled to said intake duct, said device being adapted to activate a switch to energize said burner elements when a sharp pressure drop is produced in said duct.

9. In an arrangement as set forth in claim 6, wherein said automatic means is constituted by a velocity-sensitive device coupled to said intake duct, said device being adapted to activate a switch to energize said burner elements when a sharp drop in velocity is produced in said duct.

10. In an arrangement as set forth in claim 1, wherein said filter structure includes a blower to produce a velocity of gas flow at which substantially all of the flue gas is by-passed into the filter structure.

11. In an arrangement as set forth in claim 1, wherein said filter structure includes a water scrubber.

12. In an arrangement as set forth in claim 1, wherein said filter structure includes an electrostatic precipitator.